UNITED STATES PATENT OFFICE.

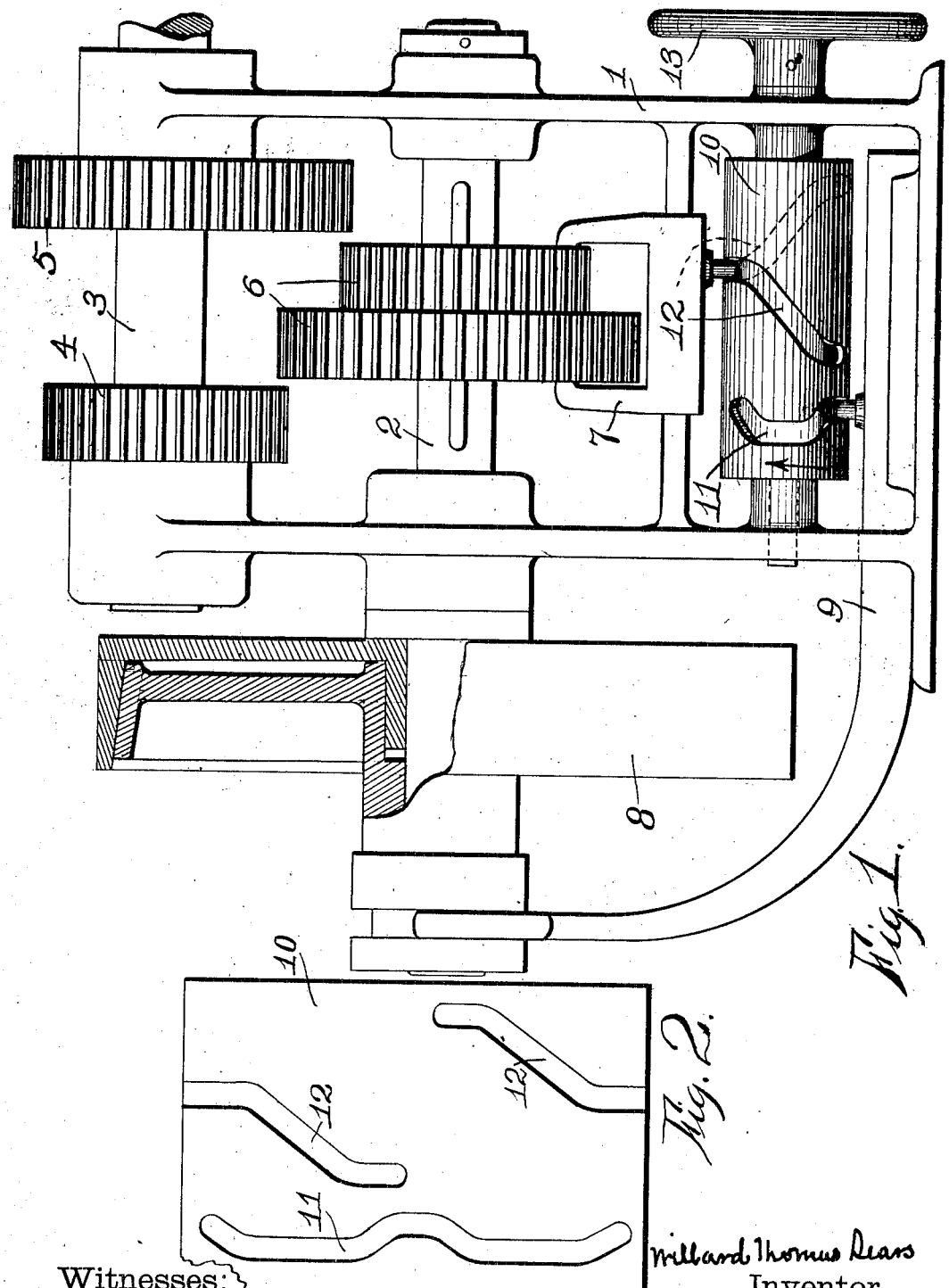

WILLARD THOMAS SEARS, OF PHILADELPHIA, PENNSYLVANIA, ASSIGNOR TO NILES-BEMENT-POND COMPANY, OF JERSEY CITY, NEW JERSEY.

POWER-TRANSMISSION DEVICE.

No. 851,842.　　　Specification of Letters Patent.　　Patented April 30, 1907.

Application filed October 6, 1906. Serial No. 337,693.

*To all whom it may concern:*

Be it known that I, WILLARD THOMAS SEARS, a citizen of the United States, residing at Philadelphia, Philadelphia county, Pennsylvania, have invented certain new and useful Improvements in Power-Transmission Devices, of which the following is a specification.

This invention pertains to apparatus for the transmission of power in which are involved relatively shifting toothed members for changing the rate of motion or the direction of motion or the condition from rest to motion and vice versa, and relates to improved means for guarding against, first, the difficulties of intermeshing the teeth when teeth do not happen to match tooth-spaces; second, the liability of the transmission of heavy work through teeth but partially engaged; and third, the labor of shifting teeth into engagement while they are under the strain of heavy duty.

The invention will be readily understood from the following description taken in connection with the accompanying drawing in which Figure 1 is a front elevation of an apparatus embodying an exemplification of my invention, and Fig. 2 a panorama of the cam.

In the drawing:—1, indicates housing-parts: 2, the driving shaft: 3, the driven shaft: 4, a gear fast on the driven shaft: 5, a second but larger gear fast on the driven shaft: 6, a pair of gears fast with each other and splined on the driving shaft: 7, a shifter engaging the pair of splined gears and adapted to slide them so that its component gears may mesh with either of the mating gears, respectively, on the driving shaft: 8, a friction clutch, which may be of any desired or suitable ordinary construction; 9, an endwise movable bar to serve in engaging and disengaging the clutch: 10, a cylindrical cam having a plurality of cam grooves, one groove being engaged by a pin projecting from shifter 7 and the other being engaged by a pin projecting from the clutch-operating bar: 11, the cam groove controlling the clutch-operating bar: 12, the cam groove controlling the shifter: and 13, a handle for turning the cam.

Ignore, for the present, the cam, and assume the presence of any appropriate handle means for operating the shifter and the clutch bar independently, and assume that the friction clutch is disengaged and that the gears 6 are in neutral or idle position and at rest. If, now, an attempt be made to slide the gear into engagement with one of the mating gears that attempt would be very apt to be defeated by the failure of tooth-ends to register with tooth-spaces, under which circumstances it would be impossible to engage the gears until after an angular adjustment of one of the gears had been effected. Assume, now, that the clutch is engaged and the driving shaft and sliding gears are in motion and that the sliding gears are in neutral idle position. If, under these conditions, an attempt be made to engage the gears an opportunity will quickly present itself for the entry of teeth into tooth-spaces, but the instant such engagement is initiated then the motion is being transmitted through the teeth at full speed and power, and full working strain is thus brought upon the teeth while they may be engaged for but a fraction of their length. This tends to break teeth and always mutilates the ends of the teeth and, the teeth being under full working strain, considerable effort would be required to complete the engagement of the teeth. Similarly when the gears are to be disengaged, considerable effort would be required in performing the act and toward the end of the operation the full strain would be imposed upon a mere trifle of tooth length.

The present invention is designed to avoid the evils referred to. These evils have long been recognized as inhering in power transmission devices employing two toothed members, of one kind or another, to be engaged or disengaged from each other, and the present invention is believed to be available in connection with any such transmission mechanism, as will be understood from the following considerations.

In the exemplification the cam is illustrated as being cylindrical and in Fig. 1 the parts are illustrated with the clutch engaged and the driving gear in neutral idle position. A half turn of the cam in the direction of the arrow will first release the clutch, the shifter remaining stationary, the shifter will then move to the left, throwing the sliding gear into engagement with gear 4, while the power is off, and the clutch will then be reengaged, thus putting on the power to the fully engaged teeth. The teeth have been slid into engagement while the power was off, thus avoiding risk and hard work in shifting. To disengage the gear the cam is turned back to normal position, the first effect being to release the clutch and cut off the power and then to slide the gear out of engagement and then, if the restoring half turn be completed, re-engage the clutch. The gear has thus been slid out of engagement while not under the strain of work, thus again avoiding risk and hard work during the sliding act. If, while the cam is in neutral position, it be turned in the direction against the arrow then the effect will be as previously described except that the sliding gear will be put to gear 5 instead of gear 4.

As thus far described it is manifest that, while ample provision has been made for avoiding the transmission of heavy power through partially engaged teeth and for avoiding the hard work of sliding teeth while under the strain of work, it will be apprehended that no mention has been made of the capacity of the device for guarding against the clashing of the ends of the teeth in attempting to initiate the engagement of the teeth. But this is fully taken care of in the device. The clutch being engaged and the driving shaft being in full motion and the sliding gears being in neutral idle position, the first effect of the turning of the cam is to release the clutch and cut off the power. If the driving shaft and sliding gear were now given time to come to rest there might be trouble due to the clashing of tooth-ends. But the initiation of tooth-engaging follows so closely upon the release of the clutch that the momentum maintains the driving shaft and sliding gear in rotation, an opportunity thus surely presenting itself for the initial engagement of the teeth. When the teeth are initially engaged then the resistance offered by the driven shaft arrests the rotation of the sliding gear, the sliding engagement being completed while the parts are without rotation. In practice I find it preferable to so proportion the cam that the clutch will be disengaged just prior to the ends of the sliding teeth reaching the face of the mating gear, thus getting the best benefit from the momentum of the parts.

Many modifications of the invention will suggest themselves to the skilled machine constructor. I have simply explained the principle of my invention and have set forth the best mode in which I at present contemplate applying that principle.

I claim:—

Power transmission apparatus comprising a pair of toothed members adapted for engagement and disengagement to and from each other, a clutch for transmitting power to one of said toothed members, a shifter for moving one of the toothed members into and out of engagement with the other, a clutch-operating part for throwing the clutch into and out of engagement, and a cam positively engaging the shifter and the clutch-operating part and arranged to hold the clutch engaged and the tooth members disengaged and by movement to first release the clutch and then to initiate the engagement of the tooth members while one of the tooth members is under the influence of momentum and then to complete the tooth engagement and then engage the clutch, combined substantially as set forth.

WILLARD THOMAS SEARS.

Witnesses:
ARCHIBALD M. O'BRIEN,
SAMUEL C. KANE.